United States Patent
Tang et al.

(10) Patent No.: US 8,792,728 B2
(45) Date of Patent: Jul. 29, 2014

(54) NEAR-DUPLICATE IMAGE DETECTION

(75) Inventors: Feng Tang, Mountain View, CA (US); Yuli Gao, Mountain View, CA (US); Suk Hwan Lim, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 12/891,234

(22) Filed: Sep. 27, 2010

(65) Prior Publication Data
US 2012/0076423 A1  Mar. 29, 2012

(51) Int. Cl.
*G06K 9/46* (2006.01)
(52) U.S. Cl.
USPC .......................................................... 382/203
(58) Field of Classification Search
None
See application file for complete search history.

(56) References Cited

U.S. PATENT DOCUMENTS

| | | | | |
|---|---|---|---|---|
| 4,876,728 A * | 10/1989 | Roth | | 382/153 |
| 5,111,516 A * | 5/1992 | Nakano et al. | | 382/156 |
| 5,510,838 A | 4/1996 | Yomdin et al. | | |
| 6,064,769 A * | 5/2000 | Nakao et al. | | 382/224 |
| 6,351,556 B1 * | 2/2002 | Loui et al. | | 382/164 |
| 6,407,777 B1 | 6/2002 | DeLuca | | |
| 6,408,028 B1 | 6/2002 | Manjunath et al. | | |
| 6,553,136 B1 * | 4/2003 | Keshet et al. | | 382/135 |
| 6,650,778 B1 * | 11/2003 | Matsugu et al. | | 382/209 |
| 6,744,933 B2 * | 6/2004 | Lai et al. | | 382/294 |
| 6,751,354 B2 * | 6/2004 | Foote et al. | | 382/224 |
| 6,826,316 B2 * | 11/2004 | Luo et al. | | 382/305 |
| 6,941,323 B1 * | 9/2005 | Galperin | | 1/1 |
| 6,975,755 B1 | 12/2005 | Baumberg | | |
| 7,139,432 B2 * | 11/2006 | Wenzel et al. | | 382/217 |
| 7,228,006 B2 | 6/2007 | Stubler et al. | | |
| 7,233,699 B2 * | 6/2007 | Wenzel et al. | | 382/209 |
| 7,254,257 B2 * | 8/2007 | Kim et al. | | 382/118 |
| 7,340,089 B2 * | 3/2008 | Nair et al. | | 382/159 |
| 7,397,956 B2 * | 7/2008 | Wenzel et al. | | 382/209 |
| 7,627,178 B2 * | 12/2009 | Suzuki et al. | | 382/190 |
| 7,680,312 B2 * | 3/2010 | Jolly et al. | | 382/128 |
| 7,702,821 B2 | 4/2010 | Feinberg et al. | | |
| 7,720,289 B2 | 5/2010 | Porikli et al. | | |
| 7,761,466 B1 * | 7/2010 | Eshghi | | 707/772 |
| 7,860,308 B2 * | 12/2010 | Shah | | 382/170 |

(Continued)

FOREIGN PATENT DOCUMENTS

| | | |
|---|---|---|
| CN | 1776716 A | 5/2006 |
| CN | 1933549 A | 3/2007 |

(Continued)

OTHER PUBLICATIONS

C. Harris and M. Stephens, "A combined corner and edge detector," In Alvey Vision Conference, pp. 147-151, 1988.

(Continued)

*Primary Examiner* — Stephen R Koziol
*Assistant Examiner* — Sean Conner

(57) ABSTRACT

A system and a method for near-duplicate image detection performed by a physical computing system includes applying a feature determining function to a number of images, a feature being defined by a geometric shape, comparing characteristics of said geometric shapes defining said features from at least two of said number of images, and characterizing said at least two of said number of images as a near-duplicate match if a predetermined percentage of said features of said at least two images match.

15 Claims, 7 Drawing Sheets

(56) References Cited

U.S. PATENT DOCUMENTS

| | | | |
|---|---|---|---|
| 7,860,317 B2* | 12/2010 | Xie et al. | 382/195 |
| 7,865,019 B2* | 1/2011 | Han et al. | 382/209 |
| 7,876,934 B2* | 1/2011 | Georgescu et al. | 382/128 |
| 7,912,294 B2 | 3/2011 | Bogoni et al. | |
| 7,991,232 B2* | 8/2011 | Iwamoto | 382/190 |
| 8,019,118 B2* | 9/2011 | Sternberg et al. | 382/100 |
| 8,019,183 B2* | 9/2011 | Kikuchi et al. | 382/305 |
| 8,050,454 B2* | 11/2011 | Yi et al. | 382/103 |
| 8,055,078 B2* | 11/2011 | Choi et al. | 382/209 |
| 8,068,701 B2* | 11/2011 | Ujisato et al. | 382/305 |
| 8,155,451 B2* | 4/2012 | Kamata et al. | 382/209 |
| 8,184,911 B2* | 5/2012 | Ofek et al. | 382/209 |
| 8,194,960 B2* | 6/2012 | Nakamura | 382/131 |
| 8,199,971 B2* | 6/2012 | Watanabe et al. | 382/103 |
| 2005/0238198 A1* | 10/2005 | Brown et al. | 382/103 |
| 2007/0071328 A1* | 3/2007 | Larsen et al. | 382/225 |
| 2007/0073937 A1 | 3/2007 | Feinberg et al. | |
| 2007/0078846 A1 | 4/2007 | Gulli et al. | |
| 2007/0237426 A1* | 10/2007 | Xie et al. | 382/305 |
| 2008/0012860 A1* | 1/2008 | Klefenz et al. | 345/441 |
| 2008/0137153 A1 | 6/2008 | Kunori et al. | |
| 2008/0205756 A1* | 8/2008 | Kamata et al. | 382/173 |
| 2008/0284864 A1 | 11/2008 | Kotake et al. | |
| 2008/0310731 A1 | 12/2008 | Stojancic et al. | |
| 2009/0112830 A1 | 4/2009 | Denoue et al. | |
| 2009/0154780 A1 | 6/2009 | Jang | |
| 2010/0166321 A1 | 7/2010 | Sawant et al. | |
| 2010/0303338 A1* | 12/2010 | Stojancic et al. | 382/154 |
| 2011/0085728 A1 | 4/2011 | Gao et al. | |
| 2011/0142350 A1 | 6/2011 | Tang et al. | |
| 2012/0027309 A1* | 2/2012 | Oami et al. | 382/203 |
| 2012/0191287 A1 | 7/2012 | Shin et al. | |

FOREIGN PATENT DOCUMENTS

| | | |
|---|---|---|
| CN | 101162524 A | 4/2008 |
| JP | H06274602 A | 9/1994 |
| JP | 2007049332 | 2/2007 |
| JP | 2007140613 A | 6/2007 |
| JP | 2008141682 A | 6/2008 |
| JP | 2009506688 A | 2/2009 |
| WO | WO-20120021633 A1 | 2/2010 |

OTHER PUBLICATIONS

Chong-Whah Ngo, Wan-Lei Zhao, Yu-Gang Jiang, "Fast Tracking of Near-Duplicate Keyframes in Broadcast Domain with Transitivity Propagation," ACM Multimedia, Oct. 2006, pp. 845-854.

D. Zhang, S. Chang, "Detecting Image Near-Duplicate by Stochastic Attribute Relational Graph Matching with Learning," ACM Multimedia, 2004.

D.G. Lowe, "Distinctive Image Features From Scale-invariant Keypoints," International Journal of Computer Vision, 60(2):91-110, 2004.

F Tang, S. Lim, N. Chang and H. Tao, "A Novel Feature Descriptor Invariant to Complex Brightness Changes," CVPR, Jun. 2009, posted online Apr. 6, 2009, <http://www.hpl.hp.com/techreports/2009/HPL-2009-71.pdf>.

Fang Tang and Hai Tao: "Object tracking with dynamic feature graphs", in Proc. IEEE Workshop on VS-PETS, Oct. 2005.

Feng Tang, Yuli Gao, "Fast Near Duplicate Detection for Personal Image Collections," ACM Multimedia, Oct. 2009.

International Preliminary Report on Patentability issued in connection with International Application No. PCT/US2010/051364, report issued Apr. 11, 2012.

International Search Report and Written Opinion issued in connection with international Application No. PCT/US2010/051364, mailed May 24, 2011.

J. Matas. O. Chum, M. Urban, T. Pajdla, "Robust Wide Baseline Stereo From Maximally Stable Extremai Regions," BMVC p. 384-393, 2002.

J., Zhu. S. Hoi, M. Lyu, S. Yan, "Near-Dupiicete Keyframe Retrieval by Nonrigid Image Matching," ACM Multimedia, 2008.

K. Greuman and T. Darrell, "Unsupervised Learning of Categories from Sets of Partially Matching Image Features", Computer Vision and Pattern Recognition, 2006 IEEE Computer Society Conference on, vol. 1 (2006), pp. 11-18.

L. Van Goal, T. Tuytelaars and A. Turina, Ke et al., "Local Features for image Retrieval," State of the Art in Content-Based Image and Video Retrieval, R.C. Veltkamp et al., Ed. Kluwer Academic Publishers, 2001, Ch. 2, pp. 21-41.

K. Milkolajczyk and C. Schmid, "Scale and affine invariant interest point detectors," International Journal of Computer Vision, 60(1)83-86, 2004.

K. Mikolajczyk, C. Schmid, "A performance evaluation of local descriptors," IEEE Transactions on Pattern Analysis and Machine Intelligence 2004 27(10):1615-1630.

K. Mkolajczyk, T. Tuytelaars, C. Schmid, A. Zisserman, J Matas, F. Schaffalitzky, T. Kadir, L. Van Gool, A Comparison of Affine Region Detectors, IJCV, 2005.

Ke et al., "An Efficient Parts-Based Near-Duplicate and Sub-image Retrieval System," MM'04, Proceedings of the 12th annual ACM international conference on Multimedia Oct. 10-16, 2004, New York, New York. USA, <http://dl.acm.org/citation.cfm?id=1027729>.

M. Brown. David S. Lowe: "Recognising Panoramas". IEEE international Conference on Computer Vision 2003: pp. 1218-1227.

Matthew Brown and David G. Lowe, "Unsupervised 3D object recognition and reconstruction in unordered datasets," International Conference on 3-D Digital Imaging and Modeling (3DIM 2005), 2005, Ottawa, Canada.

P. Viola and M. Jones, "Rapid object detection using a boosted cascade of simple features," CVPR 2001.

Qamra, Y. Mews, E. Chang, "Enhanced Perceptual Distance Functions and indexing for Image Replica Recognition," IEEE PAMI, 27(3): 379-391, 2005.

S. Belongie, J. Malik, and J. Puzicha, "Shape matching and object recognition using shape contexts, " IEEE Transactions on Pattern Analysis and Machine Intelligence, 24(4):509-522, 2002.

T. Lindeberg, "Feature detection with automatic scale seiection," International Journal of Computer Vision, 30(2)79-116, 1998.

Wang et al., "Filtering Image Spam with Near-Duplicate Detection," Conference on Email and Anti-Spam (CEAS) 2007, <http://citeseerx.ist.psu.edu/viewdoc/download?doi=10.1.1.94.9550&rep=rep1&type=pdf>.

Wanlei Zhao, Chong-Wah Ngo, Hung Khoon Tan, Xiao Wu, "Near-Duplicate Keyframe Identification with Interest Point Matching and Pattern Learning," IEEE Trans. on Multimedia, vol. 9, No. 5 (2007), pp. 1037-1048.

X. Wu, A. Hauptrnann and C Ngo, "Practical elimination of near-duplicates from web vide search," ACM Multimedia 2007.

Y. Ke, R. Sukthankar, L. Huston, "Efficient Near-Duplicate Detection and Sub-image Retrieval." ACM Multimedia, 2004, vol. 4, No. 1.

Y. Rubner, C. Tomasi and L. Guibas, "The earth mover distance as a metric for image retrieval," IJCV, 40(2), 2000.

Fujiyoshi, Hironobu, "Gradient-Based Feature Extraction, SIFT and HOG," IPSJ SIG Technical Report, Sep. 4, 2007, 17 pages.

Ichimura, Naoyuki, "Recognizing Multiple Billboard Advertisements Based on Local Invariant Features," IPSJ SIG Technical Report, Nov. 18, 2005, 11 pages.

International Preliminary Report on Patentability received for PCT Application No. PCT/US2008/075128, Mar. 3, 2011, 5 pages.

International Search Report & Written Opinion received for PCT Application No. PCT/US2008/075128; Jan. 15, 20O0, 10 pages.

\* cited by examiner

Image 1
(202)

Image 2
(204)

Image 1
(602)

Image 2
(604)

700

Apply a feature detection function to a number of images, a feature being defined by a geometric shape
(block 702)

Compare characteristics of the geometric shapes from corresponding features of at least two of the number of images
(block 704)

Characterize the at least two of the number of images as near-duplicate matches if a predetermined percentage of the features of the at least two of the number of images match
(block 706)

*Fig. 7*

NEAR-DUPLICATE IMAGE DETECTION

BACKGROUND

As the use of digital cameras increases, both professional and amateur photographers often amass large collections of digital images. These collections often include sets of images which are almost identical, but vary in small ways. These sets of almost identical images are referred to as near-duplicate images. Near-duplicate images are often produced when a photographer takes several pictures of the same scene or item.

Near-duplicate image detection functions are designed to scan through a volume of digital images and group the near-duplicate images together. A user may then do as he or she pleases with the undesired duplicates. In some cases, the user may set the near-duplicate detection function to automatically remove near-duplicate images from the volume.

Near-duplicate image detection functions generally work by detecting features on each image and analyzing various characteristics of those features. This process is often very processor intensive. As such, near-duplicate image detection functions may take long periods of time to search an entire volume of digital images and find near-duplicate image matches.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 7 is a flowchart showing an illustrative method for near-duplicate image detection, according to one example of principles described herein.

Throughout the drawings, identical reference numbers designate similar, but not necessarily identical, elements.

DETAILED DESCRIPTION

As mentioned above, near-duplicate image detection functions generally work by detecting features on each image and analyzing various characteristics of those features. The definition of a feature may vary according to the function used to detect those features. The process of analyzing and matching features is often very processor intensive. As such, near-duplicate image detection functions may take long periods of time to search an entire volume of digital images and find near-duplicate image matches.

In light of this and other issues, the present specification discloses methods and systems for near-duplicate image detection which consume a minimal amount of computing resources. According to certain illustrative examples, a feature detection function is applied to a number of digital images within a volume. These features are defined by a geometric shape such as an ellipse. A comparison is then made between the geometric characteristics such as position, rotation, and dimensions between two different features. Two or more images from the volume of digital images can then be classified as a near-duplicate image match if a predefined percentage of their features match. A feature from one image can be considered a match to a corresponding feature within another image if the two corresponding features have similar geometric characteristics.

Through use of systems and methods embodying principles described herein, a near-duplicate image detection function which consumes a minimal amount of computing resources can be realized. This provides a user with fast detection of near-duplicate image matches within large volumes of images.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment or example.

Figure 1:
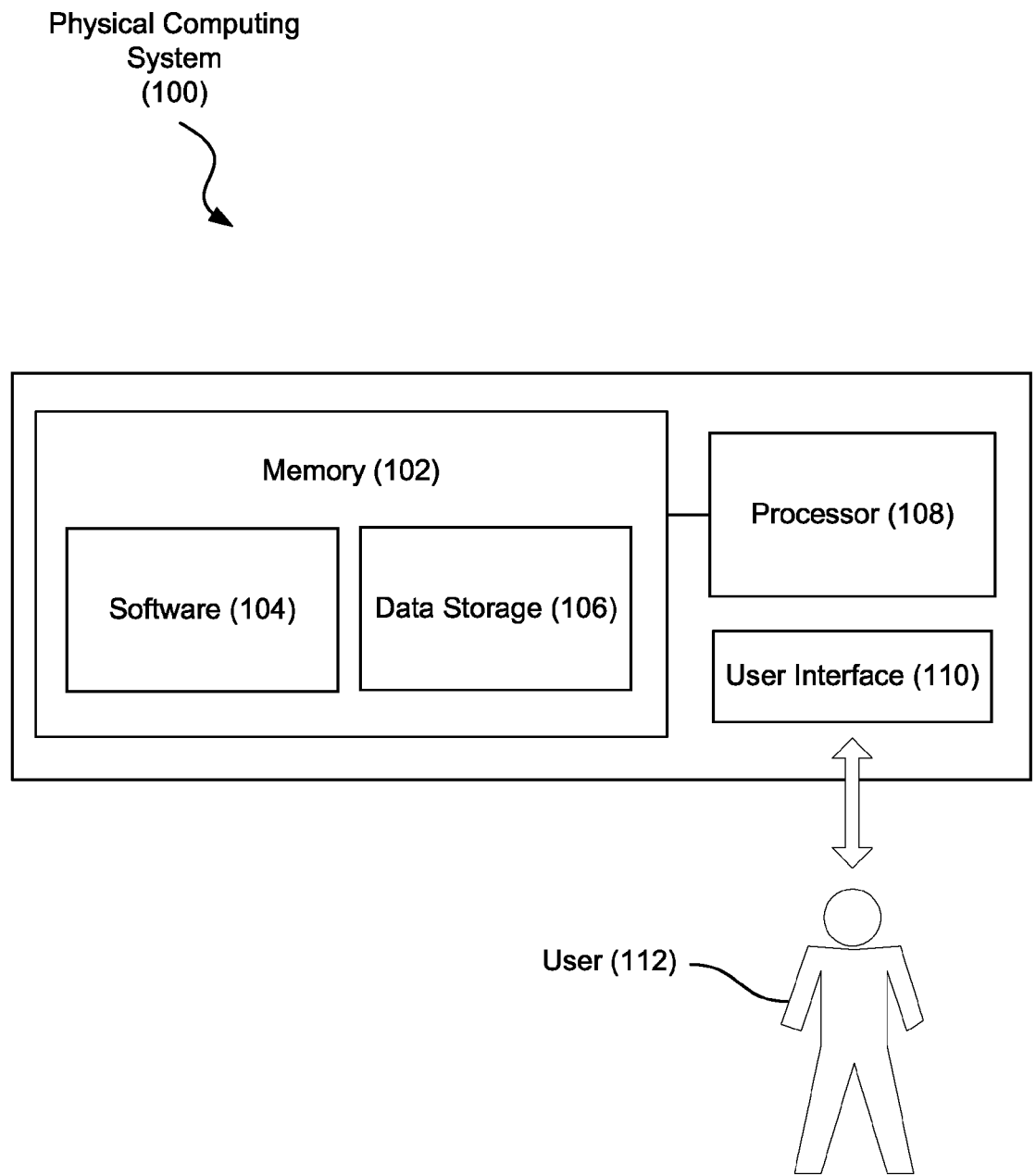
FIG. 1 is a diagram showing an illustrative physical computing system, according to one example of principles described herein.

Referring now to the figures, FIG. 1 is a diagram showing an illustrative physical computing system (100) which may be used for near-duplicate image detection applications. According to certain illustrative examples, the physical computing system (100) may include a memory (102) having machine readable instructions (104) and data (106) stored thereon. As described below, the machine readable instructions (104) can include a near-duplicate image detection application.

There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of machine readable instructions (104) and data (106).

The physical computing system (100) also includes a processor (108) for executing the machine readable instructions (104) and using or updating the data (106) in the memory (102). The physical computing system (100) may be embodied as a variety of physical computing devices including, but not limited to, a laptop or tablet computer, a desktop computer, and a Personal Digital Assistant (PDA) or mobile smart phone.

Various types of machine readable instructions (106) may be utilized by the physical computing system (100). For example, one type of machine readable instructions which may be stored in memory is a near-duplicate image detection application. As mentioned above, a near-duplicate image detection application scans a volume of digital images and finds near-duplicate image matches.

A user interface (110) may provide a means for the user (112) to interact with the computing system (100). The user interface may include any collection of devices for interfacing with a human user (112). For example, the user interface (110) may include an output component such as a display device and input components such as a mouse or keyboard. Information associated with calendar entries, including meeting entries, may be displayed to the user (112) on a display device of the user interface (110). Instructions from the user to the physical computing system (100) may be received through the input devices of the user interface (110).

Figure 2:
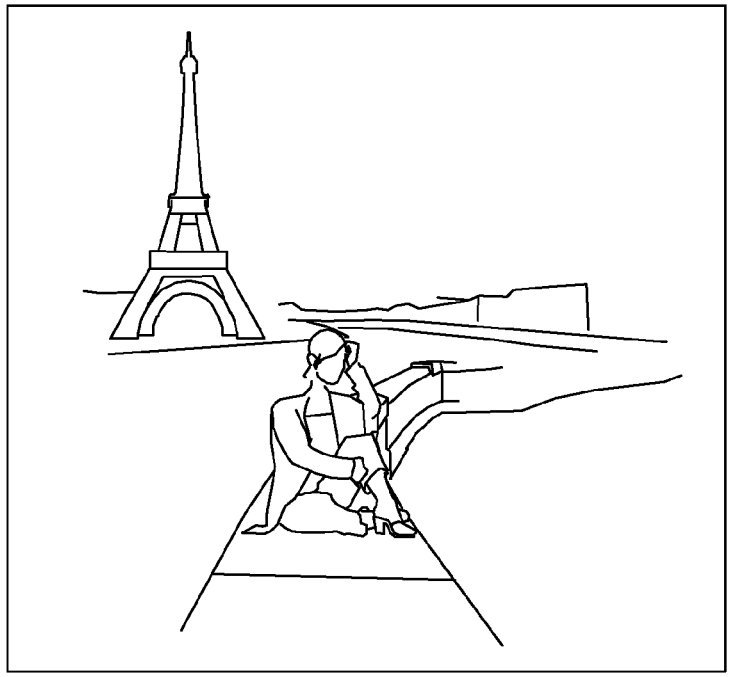
FIG. 2 is a diagram showing two illustrative images characterized as a near-duplicate match, according to one example of principles described herein.
Figure 2:
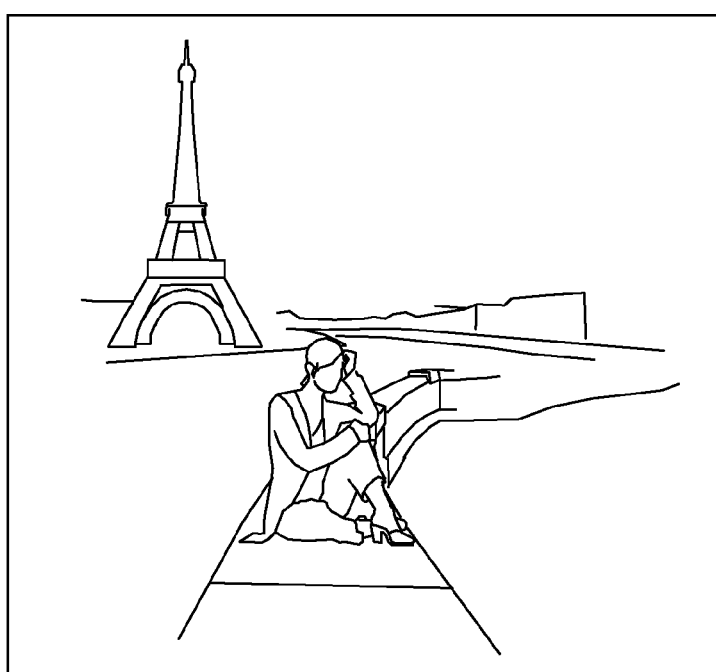

FIG. 2 is a diagram showing two illustrative images (202, 204) characterized as a near-duplicate match. As mentioned above, two images can be characterized as a near-duplicate match if they are similar in most respects but differ to a small degree. Near-duplicate images often arise when a photographer takes several pictures of the same scene. This is done to make sure that at least one of the several pictures taken turns out satisfactorily to the photographer.

The two images (202, 204) illustrated in FIG. 2 are almost identical but differ slightly. Specifically, in image 1 (202), the right arm of the subject is at a lower position than the right arm of the subject in image 2 (204). In image 2 (204), the right arm of the subject is resting on the knee while in image 1 (202), the arm is resting lower on the left leg. While this specific difference is present, the rest of the image is practically identical.

Figure 3:
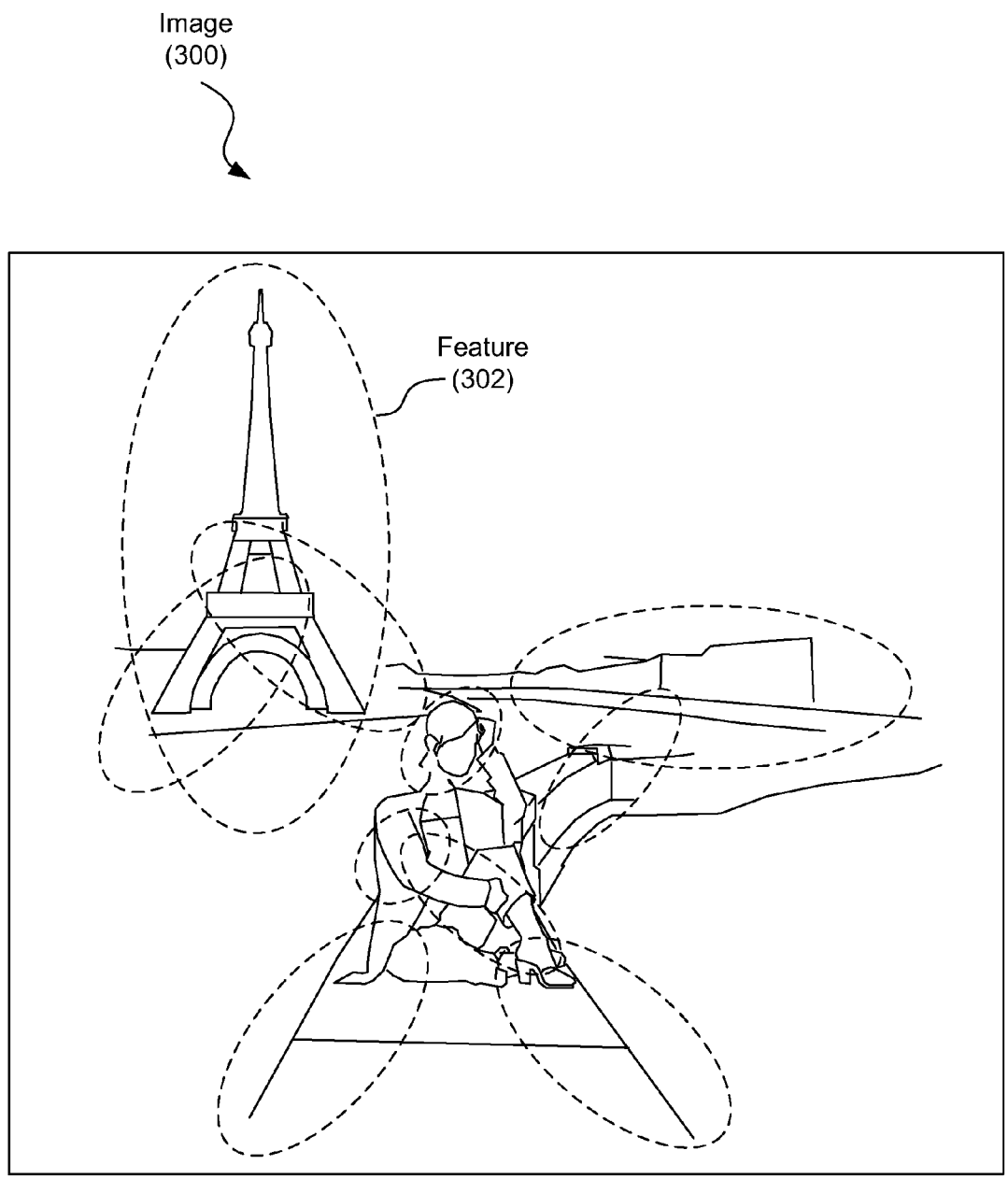
FIG. 3 is a diagram showing an illustrative number of features found on an image, according to one example of principles described herein.

FIG. 3 is a diagram showing an illustrative number of features (302) found on an image (300). According to certain illustrative examples, in order to find near-duplicate matches in a volume of images, a feature detection function is applied to each of those images. FIG. 3 illustrates the results of a feature detection function applied to one image within a volume of images.

Various feature detection functions can be used to locate particular features (302) within an image. Throughout this specification and in the appended claims, the term "feature" is used to refer to a region within an image that has been identified as a feature (302) by a feature detection function. The feature detection function can be designed to look for particular shapes or other characteristics of an image when defining features (302). The feature detection function can define a feature (302) with a geometric shape. In the case illustrated in FIG. 3, the feature detection function defines features (302) as an ellipse.

The number of features found within a particular image can depend on the type of feature detection function used and the nature of the image. For illustration purposes, the image (300) in FIG. 3 has only 9 features illustrated. However, a standard feature detection function may produce hundreds of features per image. The exact manner in which a feature detection function identifies features within an image is beyond the scope of the present specification. Thus, a detailed description is not given here.

As mentioned above, near-duplicate detection applications can work by comparing the features of two different images. If a certain amount of the features within an image fall within a predefined degree of similarity to the features of another image, then those two images can be characterized as a near-duplicate match. Many near-duplicate detection applications determine if two features from two separate images are a match by analyzing a vector or descriptor used to represent the image within those features. Vectors and descriptors are values which are computed based on the pixel data within a region of an image. For example, the near-duplicate detection application may determine the average color density of the region of an image within a defined feature. If two features from two different images have similar average color densities, then those features can be classified as a match. If most of the features within one image can be matched to most of the features within another image, then it is likely that those two images are a near-duplicate match.

However, computing the vector or descriptor representing the region of an image within each feature is very processor intensive. This means that a lot of computing resources are consumed during the process of scanning a volume of images and finding all of the near-duplicate matches. In light of this issue, the present specification discloses a near-duplicate image detection application which analyzes the geometric characteristics of the shapes used to define a feature. In the illustrated case where the geometric shape defining a feature is an ellipse, the near-duplicate image detection application would analyze the geometric characteristics of the ellipses used to define the features within each image.

Figure 4:
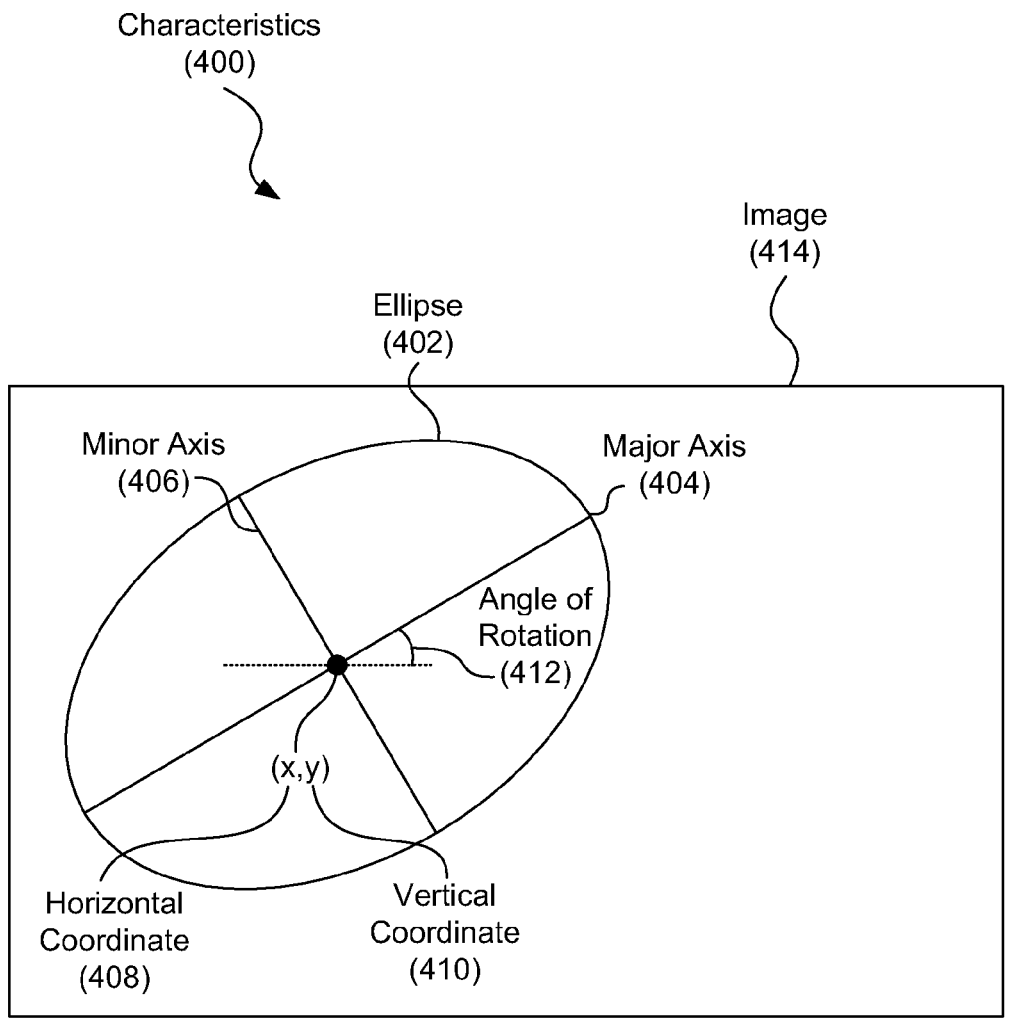
FIG. 4 is a diagram showing an illustrative ellipse and its characteristics, according to one example of principles described herein.

FIG. 4 is a diagram showing an illustrative ellipse (402) and its characteristics (400). The characteristics (400) of an ellipse (402) which may be analyzed for comparison with other ellipses defining features of another image may include the major axis (404), the minor axis (406), the angle of rotation (412), and the coordinates (408, 410) of the center of the ellipse (402). The units chosen for each of these geometric characteristics may be arbitrarily set.

The major axis (404) and the minor axis (406) define the width and the length of an ellipse. The major axis (404) refers to the long axis and the minor axis (406) refers to the short axis.

An ellipse (402) can be tilted. The angle of rotation (412) defines how much an ellipse (402) is tilted. This angle of rotation (412) may be measured from an arbitrarily set point.

The coordinates of the ellipse can define the specific position of the ellipse. In one case, the coordinates (408, 410) correspond to the exact center of the ellipse. The coordinates include a horizontal coordinate (308) and a vertical coordinate (410).

Figure 5:
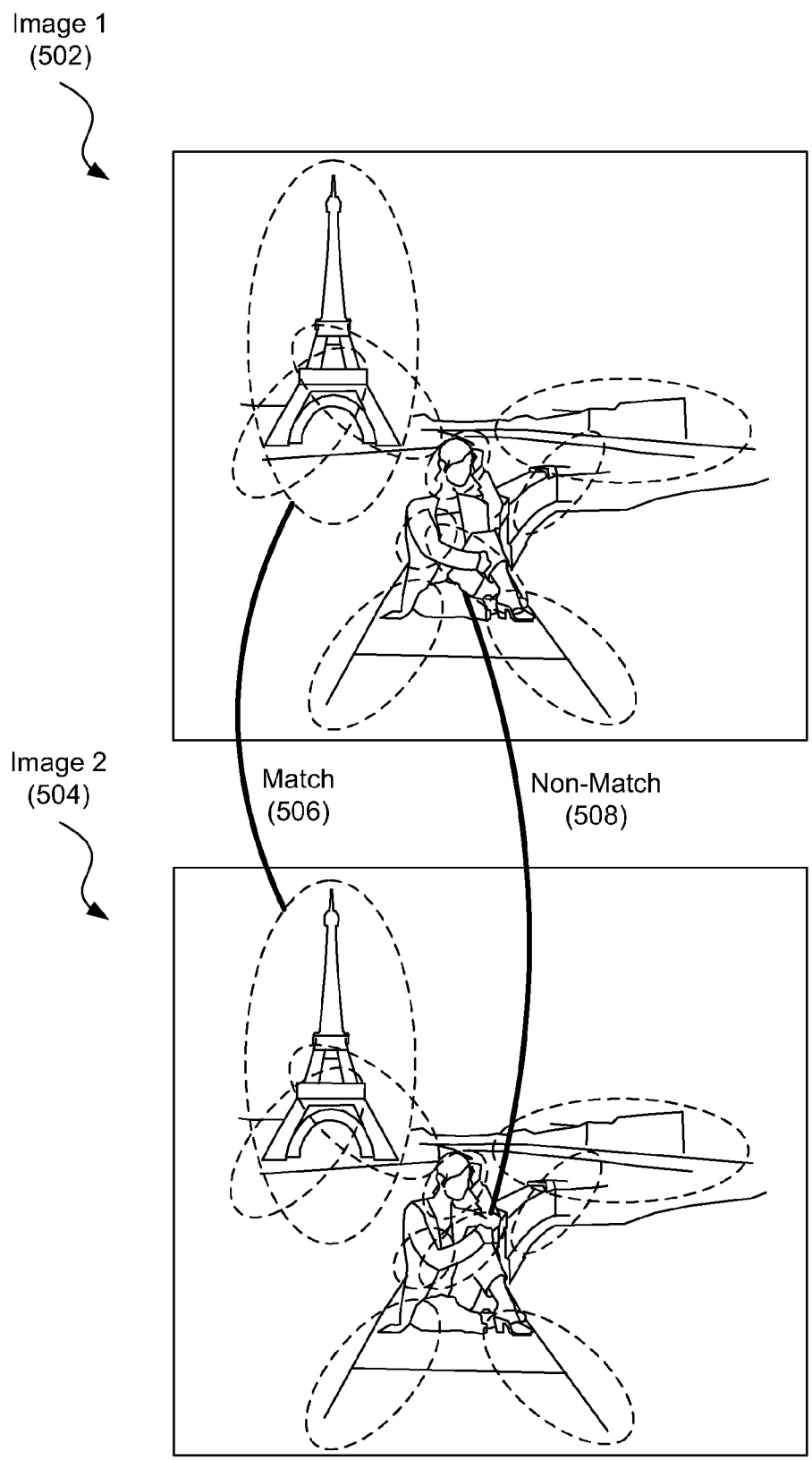
FIG. 5 is a diagram showing illustrative matches between features from two images, according to one example of principles described herein.

FIG. 5 is a diagram showing illustrative matches between features from two images. According to certain illustrative examples, two features from two separate images may be defined as a match if the geometric characteristics of those two features match. However, as mentioned above, a near-duplicate image may have slightly varying features. For example, when a photographer takes several pictures of the same scene, the camera is likely to be in a slightly different position for each image taken. Thus, the features defined by the feature determining function can have slightly different geometric characteristics. Thus, in order to still qualify these slight variations as a match, a degree of tolerance can be allowed.

One way to allow this degree of tolerance is to use a Gaussian distribution. A Gaussian distribution function is a function often used to determine probabilities. A Gaussian distribution is sometimes referred to as a bell curve. One factor that affects a Gaussian distribution is the standard deviation. The standard deviation is defined as the square root of the variance. The variance refers to how much the data points within a set vary from the mean.

The standard deviation represents how far a data point can vary from the mean. This can be used by a near-duplicate detection application where the standard deviation is defined by a characteristic multiplied by a constant. For example, the standard deviation may be defined as $\alpha * ma_i$, where $ma_i$ is the major axis of feature i, i being an index number. The constant $\alpha$ is used as a coefficient. This coefficient can be varied by a user. Varying this constant determines the degree of tolerance to be allowed between matching of features.

The probability that one characteristic of a feature matches a characteristic of another feature can be defined using a Gaussian function with the standard deviation as described above. The probability that two features are a match can be defined as follows:

$$P(Fi|Fj)=P(Xi|Xj)*P(Yi|Yj)*P(MAi|MAj)*P(MIi|MIj)*P(\theta i|\theta j)$$

Where:

P(Fi|Fj) is the probability that feature i matches feature j;

P(Xi|Xj) is the probability that the horizontal coordinate of feature i matches the horizontal coordinate of feature j;

P(Yi|Yj) is the probability that the vertical coordinate of feature i matches the vertical coordinate of feature j;

P(MAi|MAj) is the probability that the major axis of feature i matches the major axis of feature j;

P(MIi|MIj) is the probability that the minor axis of feature i matches the minor axis of feature j;

P($\theta i|\theta j$) is the probability that the angle of rotation of feature i matches the angle of rotation of feature j; and i is an index of features in one image; and j is an index of features in another image.

As can be noted from the above definition, the probability that two features are a match is based on the probability that each geometric characteristic of the ellipse defining the two features match.

In some cases, a practical standard deviation may produce too many matches where a match does not exist in reality. Therefore, images which are not near-duplicate matches may be classified as such. To reduce this effect, a further criterion used to determine if two features are a match is to consider the neighbors of those features as well. For example, if the five closest neighboring features of one image match the five closest neighbors of a feature from another image, then it is more likely that those features are in fact a match. Various formulas may be used to determine if the neighbors of a particular feature of one image match the neighbors of a particular feature from another image.

FIG. 5 illustrates two near-duplicate images (502, 504) with the features defined. An example of two features which match (506) is shown. Additionally, an example of two features which do not match (508) is shown. In this case, most of the features would be classified as a match. Therefore, these two images (502, 504) can be classified as near duplicate matches. In some cases, two images can be characterized as a near duplicate match if a predefined percentage of the features within one image have a match to a feature within another image. This predefined percentage may be adjusted by a user based on a preference for how similar two images should be in order to be considered a near-duplicate match. For example, if a user wishes to be strict about what constitutes a near-duplicate match, then the user can set this predefined percentage to approximately 90%. Conversely, if the user prefers a less strict definition of a near-duplicate match, then the user may lower the predefined percentage to approximately 75%. In some cases, a user may set the predefined percentage above or below the percentages given as examples given above.

Figure 6:
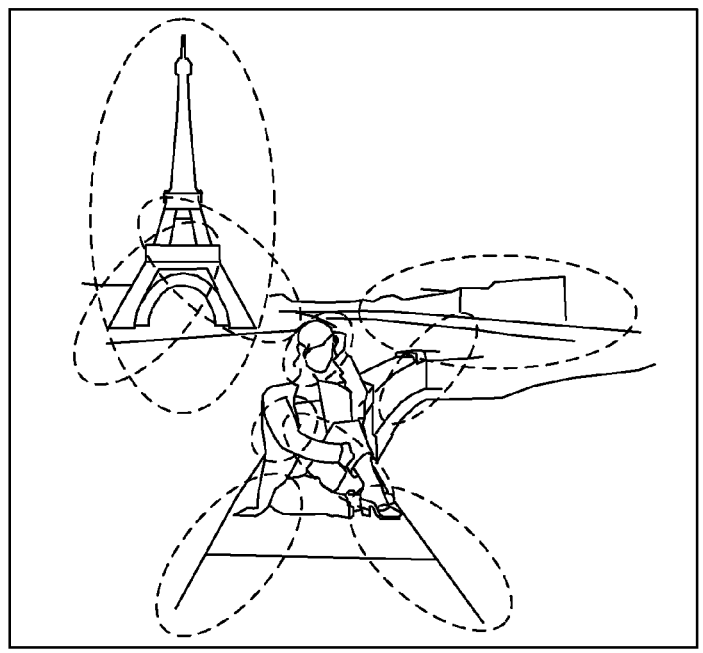
FIG. 6 is a diagram showing two illustrative images which are not near-duplicate matches, according to one example of principles described herein.
Figure 6:
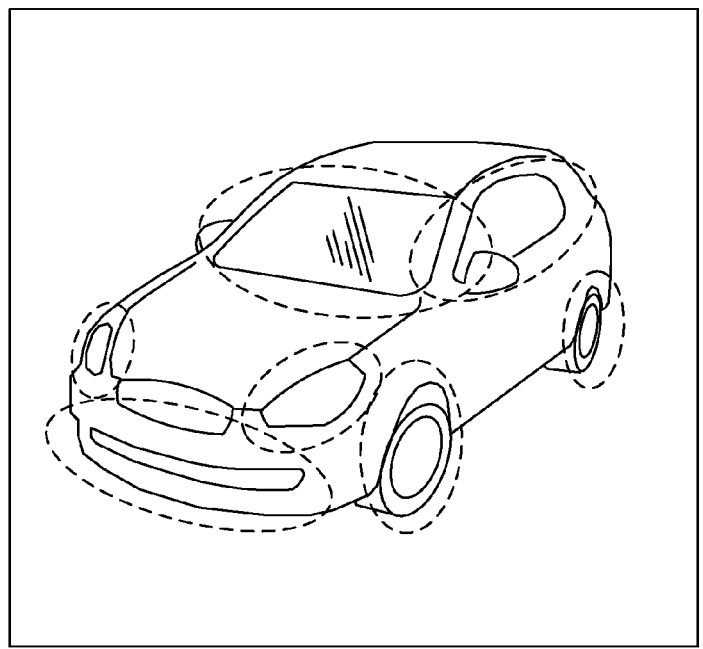

FIG. 6 is a diagram showing two illustrative images which are not near-duplicate matches. FIG. 6 illustrates two completely different images (602, 604). In this case, the near-duplicate image application would not classify these two images (602, 604) as a near-duplicate match. Although it is probable that some matching features may be found, it is highly unlikely that most features within these two images (602, 604) match.

FIG. 7 is a flowchart showing an illustrative method for near-duplicate image detection. According to certain illustrative examples, the method includes applying (block 702) a feature detection function to a number of images, a feature being defined by a geometric shape, comparing (block 704) characteristics of the geometric shapes from corresponding features of at least two of the number of images, and characterizing (block 706) the at least two of the number of images as near-duplicate matches if a predetermined percentage of the features of the at least two of the number of images match.

Through use of systems and methods embodying principles described herein, a near-duplicate image detection function which consumes a minimal amount of computing resources can be realized. This provides a user with fast detection of near-duplicate image matches within large volumes of images.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for near-duplicate image detection performed by a physical computing system, the method comprising:
    applying a feature detection function to a number of images individually to identify a number of features within each image, a feature being a region within a particular image defined by a geometric shape to identify the feature;
    comparing characteristics of said geometric shapes identifying said features within a first image with characteristics of said geometric shapes identifying said features within a second image; and
    characterizing said first and second images as a near-duplicate match if a predetermined percentage of said features of said first and second images match,
    wherein the geometric shapes are not included within the content of the images.

2. The method of claim 1, in which said geometric shape comprises an ellipse.

3. The method of claim 2, in which said characteristics of said geometric shapes comprise a horizontal coordinate, a vertical coordinate, a major axis, a minor axis, an angle of rotation, or combinations thereof.

4. The method of claim 1, further comprising using a Gaussian distribution to determine a tolerance range, said tolerance range used to determine if said corresponding features from said first and second images match.

5. The method of claim 4, in which a standard deviation used by said Gaussian distribution is a value of a characteristic of said geometric shape multiplied by a coefficient.

6. The method of claim 5, further comprising adjusting said coefficient to adjust said tolerance range.

7. The method of claim 1, further comprising determining if said features from said first and second images match by determining if neighboring features of said features from said first and second images match.

8. A physical computing system comprising:
    a processor; and
    a memory communicatively coupled to said processor;
    in which said processor:
        applies a feature detection function to a number of images individually to identify a number of features within each image, a feature being a region within a particular image defined by a geometric shape to identify the feature;

compares characteristics of said geometric shapes; and characterizes at least two of said number of images as near-duplicate matches if a predetermined percentage of said features of said at least two of said number of images match, wherein the geometric shapes are not included within the content of the images.

9. The system of claim 8, in which said geometric shape comprises an ellipse.

10. The system of claim 9, in which said characteristics of said geometric shapes comprise a horizontal coordinate, a vertical coordinate, a major axis, a minor axis, an angle of rotation, or combinations thereof.

11. The system of claim 8, in which said processor uses a Gaussian distribution to determine a tolerance range, said tolerance range used to determine if a feature from one of said number of images matches a feature from another of said number of images.

12. The system of claim 11, in which a standard deviation used by said Gaussian distribution is a value of a characteristic of said geometric shape multiplied by a constant.

13. The system of claim 12, in which said processor adjusts said constant to adjust said tolerance range.

14. The system of claim 8, in which said processor determines if a feature from one of said number of images matches a feature from another of said number of images matches by determining if neighboring features of said features match.

15. A method for near-duplicate image detection performed by a physical computing system, the method comprising:

applying a feature detection function to a number of images individually to identify a number of features within each image, a feature being a region within a particular image defined by an ellipse to identify the feature;

comparing characteristics of said ellipses; and characterizing at least two of said number of images as near-duplicate matches if a predetermined percentage of said features of said at least two of said number of images match;

in which given features are classified as a match if values of said characteristics of said ellipses defining the given features are within a predefined tolerance range, wherein the ellipses are not included within the content of the images.

* * * * *